US008929660B2

(12) United States Patent
Joshi (10) Patent No.: US 8,929,660 B2
(45) Date of Patent: Jan. 6, 2015

(54) APPARATUS AND METHOD FOR LANE MARKING ANALYSIS (75) Inventor: Maneesha Joshi, Austin, TX (US)

(73) Assignee: TomTom North America, Inc., Lebanon, NH (US)

( * ) Notice: Subject to any disclaimer, the term of this patent is extended or adjusted under 35 U.S.C. 154(b) by 16 days.

(21) Appl. No.: 13/318,621

(22) PCT Filed: Dec. 31, 2009

(86) PCT No.: PCT/US2009/069888
§ 371 (c)(1),
(2), (4) Date: Jan. 17, 2012

(87) PCT Pub. No.: WO2010/128999
PCT Pub. Date: Nov. 11, 2010

(65) Prior Publication Data
US 2012/0121183 A1    May 17, 2012

Related U.S. Application Data (60) Provisional application No. 61/215,239, filed on May 4, 2009.

(51) Int. Cl.
G06K 9/46      (2006.01)
G01C 21/32    (2006.01)
G08G 1/01     (2006.01)
G08G 1/052    (2006.01)
G08G 1/0968  (2006.01)

(52) U.S. Cl.
CPC .............. *G01C 21/32* (2013.01); *G08G 1/0104* (2013.01); *G08G 1/052* (2013.01); *G08G 1/096844* (2013.01)

USPC .......................................................... 382/191

(58) Field of Classification Search
None
See application file for complete search history.

(56) References Cited

U.S. PATENT DOCUMENTS

| 2004/0016870 A1* | 1/2004 | Pawlicki et al. ............ 250/208.1 |
| 2004/0042638 A1* | 3/2004 | Iwano ............................ 382/104 |
| 2005/0072922 A1* | 4/2005 | Moisel et al. ................... 250/330 |
| 2007/0129892 A1* | 6/2007 | Smartt et al. ......................... 702/5 |
| 2007/0168113 A1* | 7/2007 | Litkouhi et al. .............. 701/200 |
| 2008/0027627 A1* | 1/2008 | Ikeda et al. .................... 701/117 |
| 2008/0298719 A1* | 12/2008 | Sengupta et al. ............. 382/294 |
| 2009/0174577 A1* | 7/2009 | Nakamura et al. ......... 340/995.1 |
| 2011/0235874 A1* | 9/2011 | Siren et al. .................... 382/128 |

OTHER PUBLICATIONS

International Search Report issued Mar. 15, 2010 for International Application No. PCT/US2009/069888.

* cited by examiner

*Primary Examiner* — Stephen R Koziol
*Assistant Examiner* — Delomia Gilliard (57) ABSTRACT Embodiments of the present invention provide a method of determining a location at which a lane divider marking changes type, comprising determining (350) a first type of lane divider (120) marking based upon a frequency spectrum determined by Fourier analysis of first image data (431) corresponding to a first area, determining (350) a second type of lane divider (130) marking based upon a frequency spectrum determined by Fourier analysis of second image data (432) corresponding to a second area, and determining (360) a geographic location at which the lane divider marking changes type according to a comparison of the first and second types (120, 130) of lane divider marking.

20 Claims, 7 Drawing Sheets

APPARATUS AND METHOD FOR LANE MARKING ANALYSIS

This application is the National Stage of International Application No. PCT/US2009/069888, filed Dec. 31, 2009 and designating the United States. The entire contents of this application is incorporated herein by reference.

This application claims priority from U.S. Provisional Application No. 61/215,239, filed on May 4, 2009. The entire contents of this application is incorporated herein by reference.

BACKGROUND

Navigation devices which utilise map data to determine a route and provide route guidance are in common use. The map data upon which route determination and guidance is based must be continually updated to reflect changes and additions to a road network. Furthermore, driver assistance system may be used which assist drivers safely navigating the road network.

It is an object of embodiments of the invention to at least mitigate one or more of the problems of the prior art.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Embodiments of the present invention determine changes in a type or configuration of lane divider marking. Some embodiments of the invention determine a change between first and second types of lane divider marking, wherein the first and second types are selected from amongst a plurality of types of lane divider marking. Some embodiments of the present invention relate to apparatus and methods for use in populating a road database. Some embodiments of the invention relate to Advanced Driver Assistance Systems (ADAS) and methods for use therein.

Figure 1:
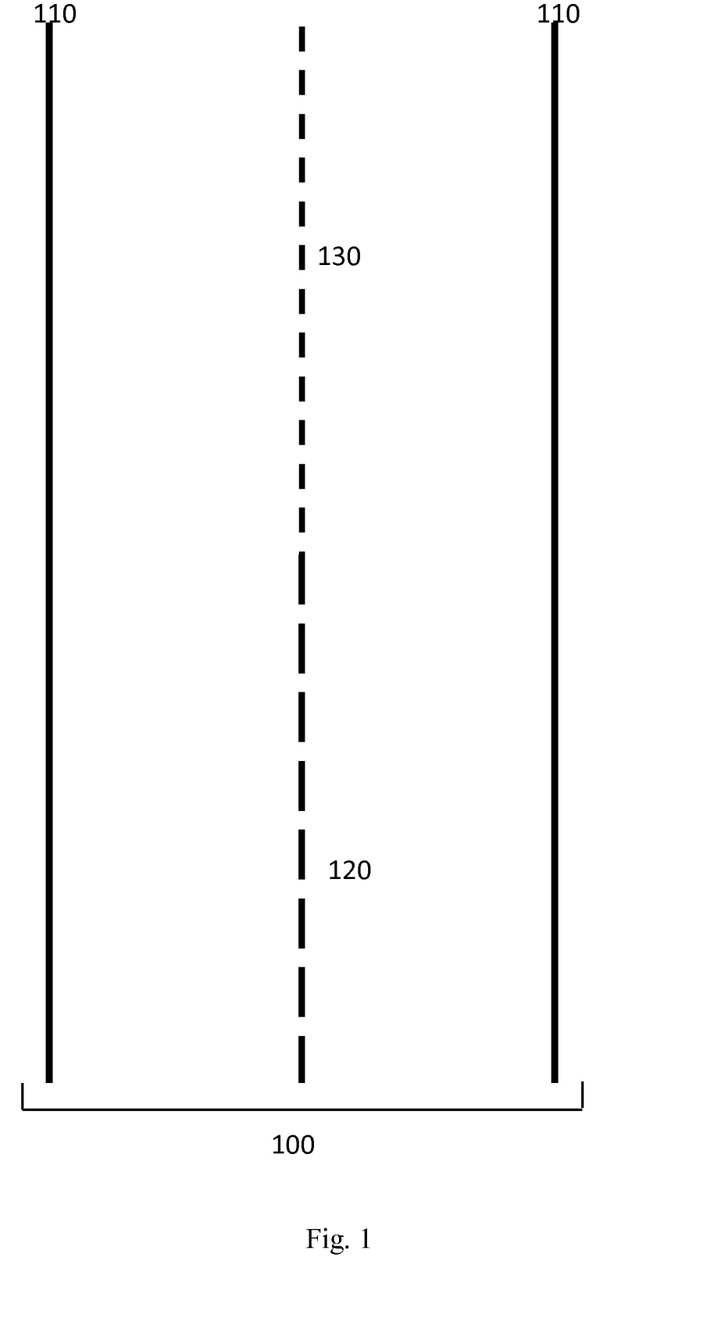
FIG. 1 illustrates markings on an exemplary section of road.

FIG. 1 illustrates an example section 100 of road markings. Generally, a road is dark in colour i.e. grey or black, whilst road markings are lighter in colour i.e. yellow, red or white. It will be realised that the illustration in FIG. 1, wherein the road markings are shown in black, is an inverse of a real-world situation. However this is merely for ease of reproduction and does not limit the present invention.

Referring to FIG. 1, the road markings 100 are for a road having a single carriageway in each direction. The road markings include road-edge boundary lines 110 at either-side of the road and a lane divider marking 120, 130 generally along a centre-line of the road 100. The lane divider marking 120, 130 includes a length having a first pattern 120 and a length having a second pattern 130. In this example, the first pattern 120 is a relatively long line or dash whilst the section pattern 130 is a relatively short line or dash, although these configurations are merely illustrative.

Figure 2:
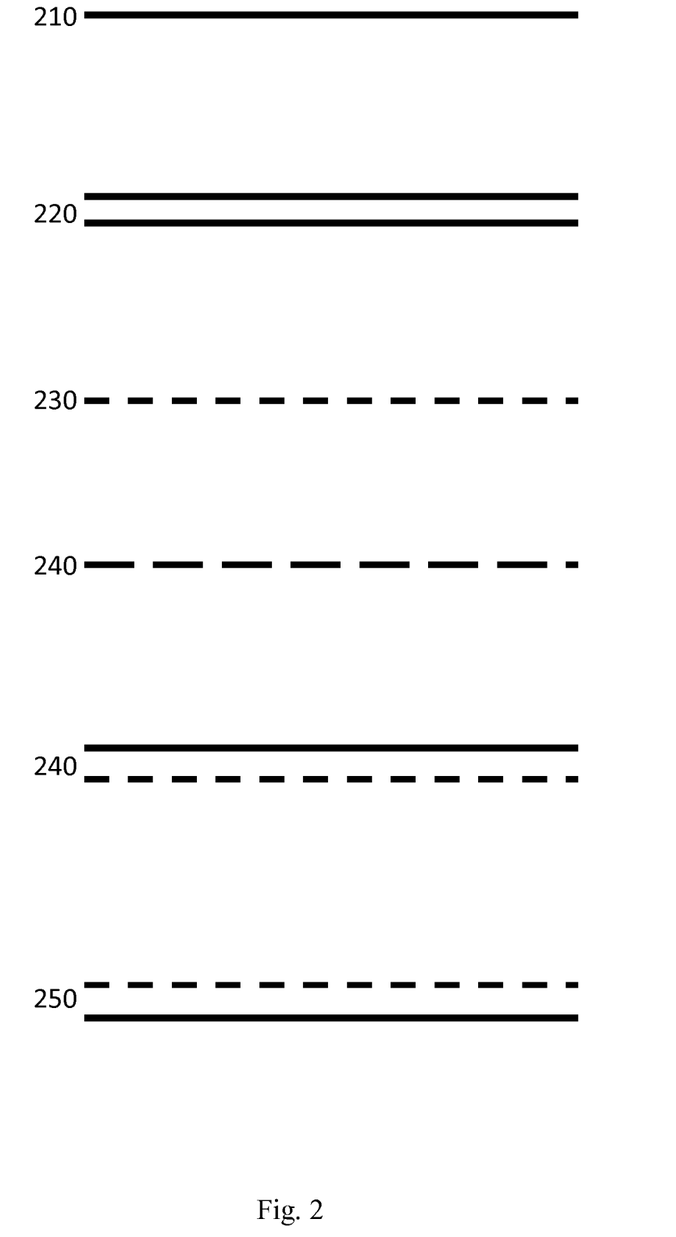
FIG. 2 illustrates example lane divider road markings.

A line divider marking 120, 130 is generally selected, for example by an agency responsible for maintaining the road or the road's designer, from amongst a plurality of types of lane divider marking. For example, as shown in FIG. 2, a first type 210 may be a single continuous line, a second type 220 may be a double continuous line, a third type 230 may be a relatively short-dashed line, a fourth type 240 may be a relatively long-dashed line, a fifth type 250 may be a single continuous line and a dashed line and a sixth type 260 may be a single continuous line and a dashed line in opposite relation i.e. alternate sides to the fifth type. It will be realised that the types of lane divider marking shown in FIG. 2 are merely illustrative and that other types and configurations exist. The available types of line divider marking are usually defined by legislative authorities responsible for road marking in a region i.e. country, state, etc.

It is frequently desired to determine a location at which a lane divider marking changes type. It will be understood that lane divider marking is intended to mean road surface markings which are periodic in nature.

A road mapping database storing road mapping data for use with navigation devices must be continually updated to reflect changes made to existing roads and newly constructed roads. One way of updating the road mapping database is using a survey vehicle. The survey vehicle is equipped with one or more cameras and GPS recording equipment to record image data and store location information obtained whilst traversing roads. The stored image data and location information are then analysed to determine features of the roads to populate the road mapping database. One feature of the road mapping database is lane division information. For example, the road mapping database may store information indicating that a lane divider marking of a section of road indicates that it is not possible to change lanes or overtake, or may indicate that a section of lane divider marking indicates that drivers wishing to take an exit should change lanes.

In another application, an Advanced Driver Assistance System (ADAS) is arranged to detect the lane divider marking and provide feedback to a driver. For example, an ADAS system may detect when a vehicle carrying the ADAS system deviates over the lane divider marking for more than a predetermined amount of time. In this case, feedback may be provided to the driver in the form or a visual, audible and/or motion-based feedback signaling to the driver that the vehicle has strayed over the lane divider marking. In such ADAS systems it is desirable to detect a location where the lane divider marking changes type such that appropriate feedback may be provided in certain circumstances.

Figure 3:
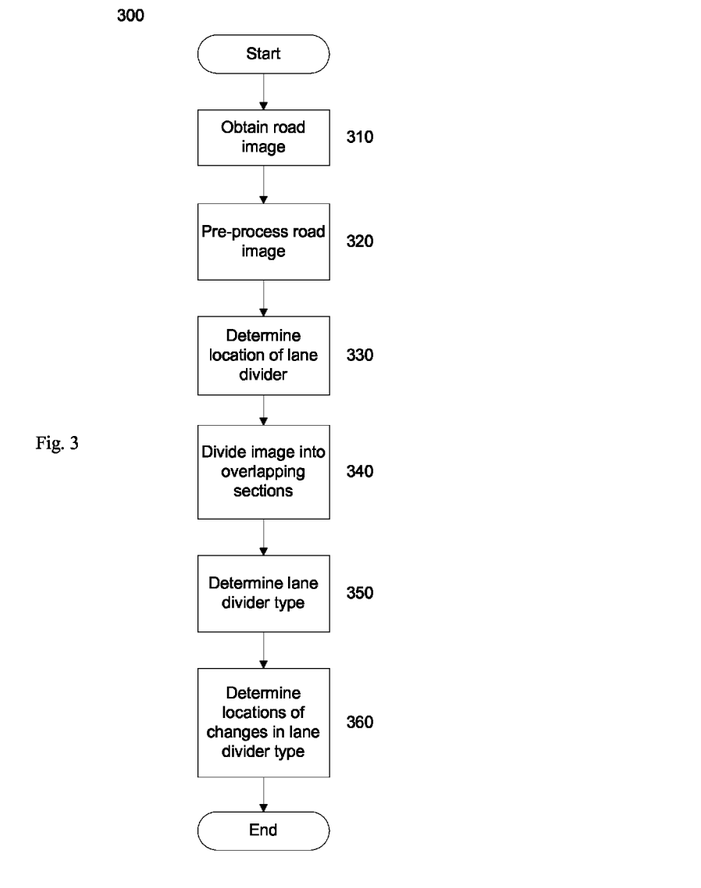
FIG. 3 illustrates a method according to an embodiment of the invention.

FIG. 3 illustrates a method 300 according to an embodiment of the invention. The method 300 shown in FIG. 3 determines a location at which a lane divider marking changes type.

The method 300 comprises a step 310 in which image data of a section of road is obtained. The image data may be obtained from a number of different sources. As mentioned above, in the case of a system for updating or populating a road mapping database, the image data may be obtained from one or more cameras of a survey vehicle. However, the image data may also be satellite or aerial imagery such as that obtained from a survey plane. The section of road may be a predetermined length e.g. 1 km, although this is merely illustrative. In the case of an ADAS system, the image data may be obtained in real time, or substantially real-time, from one or more cameras mounted on a vehicle carrying the ADAS system. In this case, the section of road may be that visible from the vehicle camera. Ideally, the image data is linearly referenced. That is, viewing along the axis of the road. In some embodiments, a camera outputting the image data is oriented vertically i.e. tangent to a sphere of the earth. The image data may comprise a plurality of rows of pixel data transverse to the axis of the road.

In step 320 pre-processing may be performed on the image data. The pre-processing may include determining whether the image data is suitable for lane divider marking analysis. For example, if the image data is too dark, too poor quality or too bright, then reliable lane divider marking analysis may not be possible using the image data. In this case, the image data for a section of road may be discarded. Similarly, it may be determined in step 320 whether the image data is obscured, such as by a vehicle straddling the lane divider marking and, if so, the image data for that section of road may be discarded.

The pre-processing in step 320 may include a RGB to intensity conversion process if the image data is in colour. The pre-processing may include normalising the intensity of the data image to a predetermined intensity level or to within a predetermined intensity range. Normalising the intensity of the image data allows more accurate comparison of the image data, and information determined from the image data, with reference information, as will be explained.

In step 330 a location in the image data of one or more lane divider markings to be analysed are determined, such that only a portion of the image data containing the lane divider marking is considered. Referring again to FIG. 1, only the portion of the road containing the lane divider marking 120, 130 is selected for further analysis in step 330. The portion selected may be elongate and generally parallel to an axis of the road. The portion of the image data containing information corresponding to the road-edge boundary markings is excluded from consideration in step 330. In the case of a multi-lane road i.e. a road having a plurality of carriageways or lanes in the same direction each having a lane divider marking, each lane divider marking is separately analysed i.e. one lane divider marking is selected in step 330 for analysis. Other lane divider markings may be separately analysed in further iterations of the method or in respective image analysis threads. Thus, in step 330 an area of the road image is selected which contains a single lane divider marking for consideration. The area of the road image may include a region of the road surface a predetermined distance either side of the lane divider marking 120, 130.

In step 340 the portion of the image data containing the lane divider marking 120, 130 is divided into a plurality of overlapping target segments, each of a target length. The target length is selected according to one or more conditions, such as how often it is expected that the lane divider marking will change type (more frequent changes may require a shorter target length), the type and resolution of the image data, the application in question (an ADAS system may require a shorter target length to more quickly detect changes in lane divider marking type).

Figure 4:
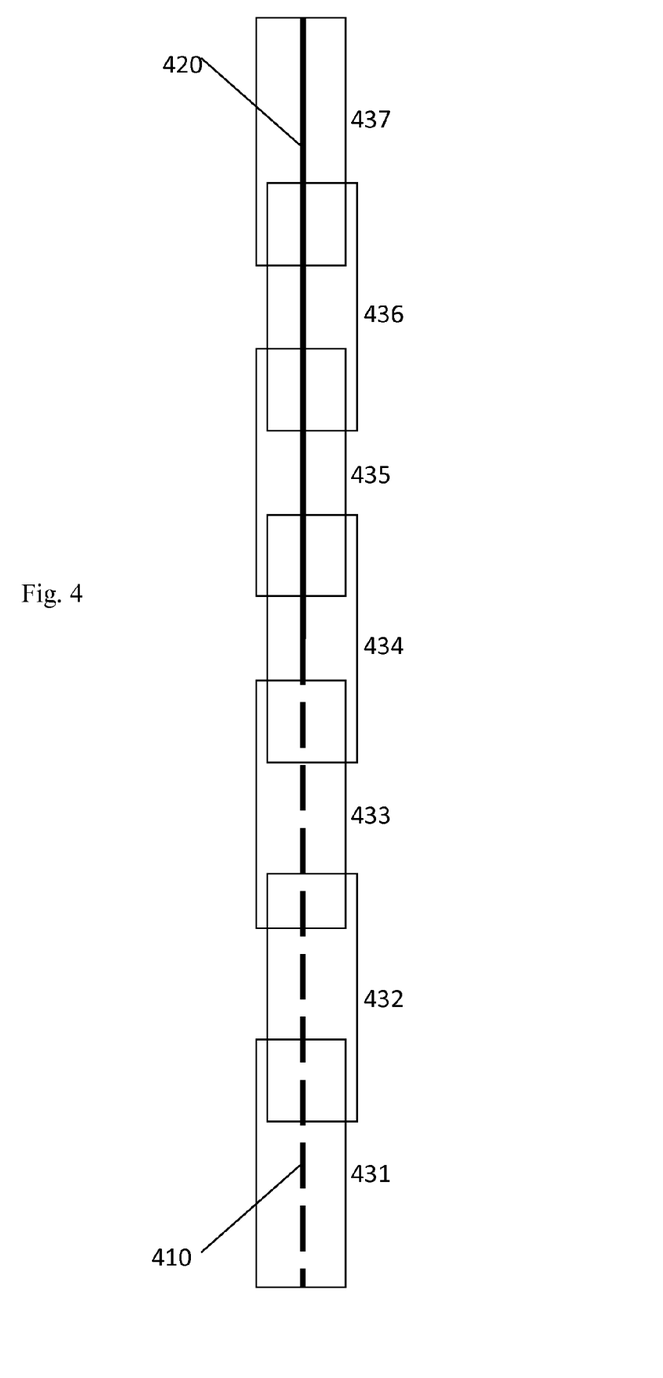
FIG. 4 shows a lane divider marking and overlapping target length indications according to an embodiment of the invention.

FIG. 4 illustrates the portion of the image data selected in step 330 to contain the lane divider marking which comprises a dashed section 410 and a continuous section 420. FIG. 4 further illustrates a plurality of overlapping target segments 431-437 of the lane divider marking selected in step 340. Whilst FIG. 4 shows even-numbered segments being offset laterally from odd-numbered segments, this is merely for illustrative purposes to more clearly indicate the overlapping-nature of the segments and it would be expected that the segments 431-437 are in alignment.

Figure 5:
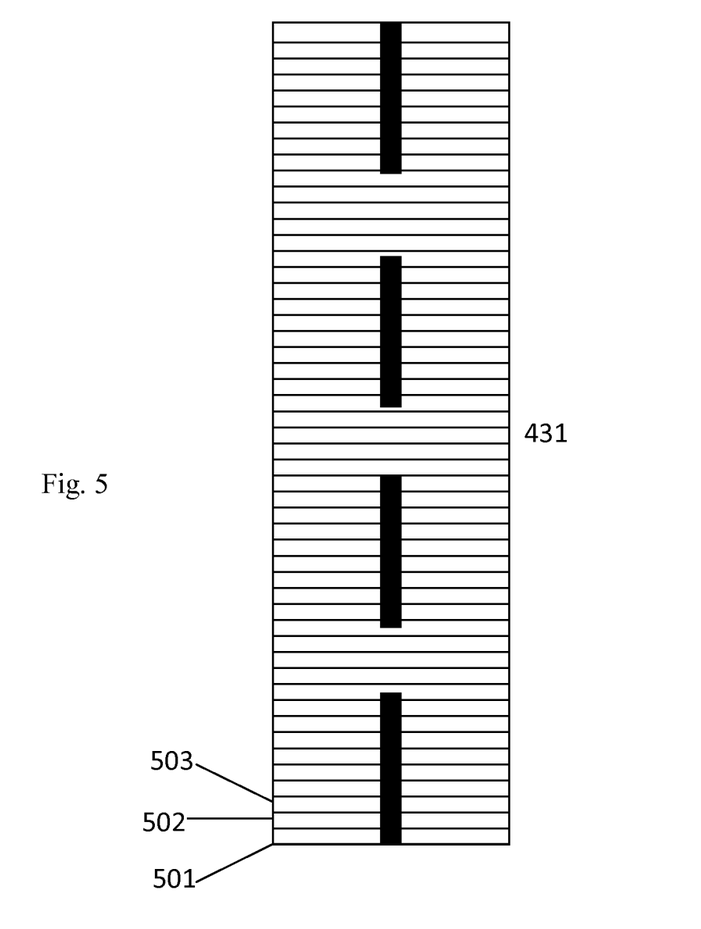
FIG. 5 shows a lane divider marking divided into a plurality of transverse regions according to an embodiment of the invention.

In step 350 a location of a change in a type lane divider marking is determined. In order to detect the change in type of lane divider marking, a type of lane divider marking in each of the segments 431-437 selected in step 340 is determined. The type of lane divider in each portion 431-437 is determined based upon Fourier analysis of an intensity signal of each segment 431-437. Referring to FIG. 5, each segment is subdivided into a plurality of transverse intensity regions i.e. regions crossing the location of the lane divider generally transverse to the axis of the marking. Some of the intensity regions are indicated at 501, 502, 503 in FIG. 5, although not all intensity regions are indicated for clarity. In some embodiments, each intensity region 501, 502 and 503 corresponds to a pixel-row, although in other embodiments each region 501, 502, 503 may comprise more than one row of pixels. The intensity of each region 501, 502, 503 is then determined by averaging the intensity of all of the pixels in the region 501, 502, 503. For example, when each transverse region corresponds to a single pixel-row, a single intensity for each transverse region could be computed as the average of the intensity of all pixels in the row. In this way, an intensity signal for each segment 431-437 may be determined.

Figure 6:
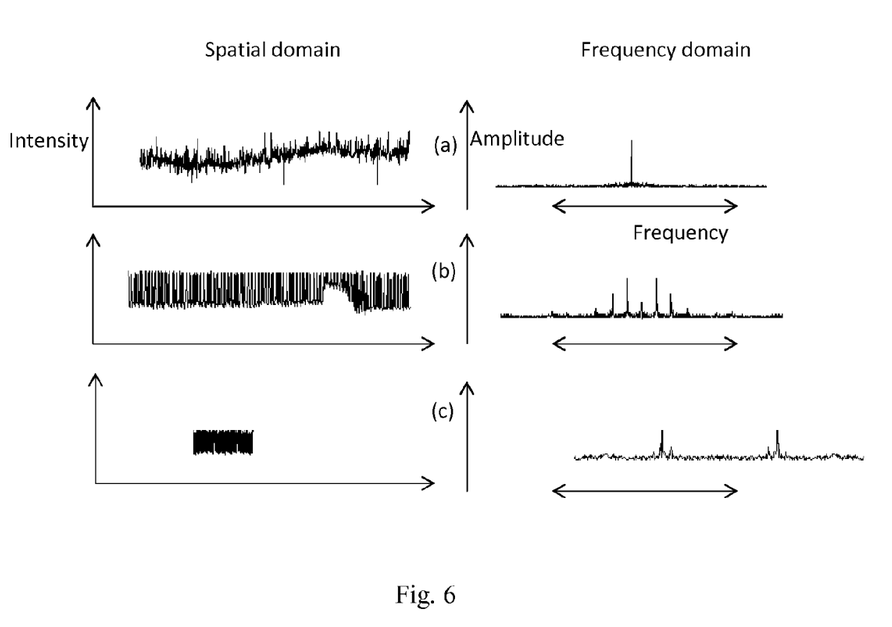
FIG. 6 shows example spatial intensity signals for various lane divider markings and corresponding frequency spectrum signals.

FIG. 6 illustrates, in its left-hand side, intensity signal plotted along the spatial domain corresponding to the longitudinal axis of the segment 431-437 for three different configurations of lane divider marking. FIG. 6(*a*) illustrates the intensity signal for a solid line or continuous lane divider marking, FIG. 6(*b*) illustrates the same for a lane divider marking having relatively long dashes and FIG. 6(*c*) shows the same for a lane divider marking having relatively short dashes.

Once an intensity of each intensity region has been determined, a Fourier transform may be applied to the intensity signal to determine a frequency spectrum for each segment 431-437. The right-hand side of FIG. 6 shows a frequency spectrum generated by a Fourier transform of the corresponding intensity signals. As shown, each configuration of lane divider marking has a respective, different, frequency spectrum. By comparing the obtained frequency spectrum for a lane divider segment 431-437 against a plurality of reference frequency spectrums, a determination of lane divider marking type may be made. That is, it may be determined which type of lane divider type is present in each segment 431-437.

A change in lane divider marking type may be determined by comparison of the determined lane divider type for each segment 431-437. In one embodiment, the determined lane divider type for adjacent segments 431-437 is compared. For example, a determined lane divider type for segment 431 is compared against the lane divider type determined for segment 432. However, in some circumstances when a change in the type of lane divider marking occurs mid-way along a segment, it may not be possible to accurately determine the type of lane divider type in that segment. In this case, a comparison of lane divider type for the previous segment and the immediately adjacent segment may not be possible. Therefore, in some embodiments, if the type of lane divider for adjacent segments cannot be determined, the lane divider type for an nth segment is compared against an n+2th segment or an n+3th type etc. In some circumstances, this may allow a more accurate determination of lane divider type change locations.

Once a change in the type of lane divider markings between two segments is determined, then the geographic location i.e. in a predetermined coordinate system of the change in type of lane divider markings may be determined. In a map database system, the geographic location, i.e. determined from the location information associated with the image data, may be stored in the database as a lane marking change location. In an ADAS system, an indication of the change of type of lane marking may be input to a control unit or an indication in the control unit may be set i.e. a flag set in a register to indicate the change in lane divider marking type.

Figure 7:
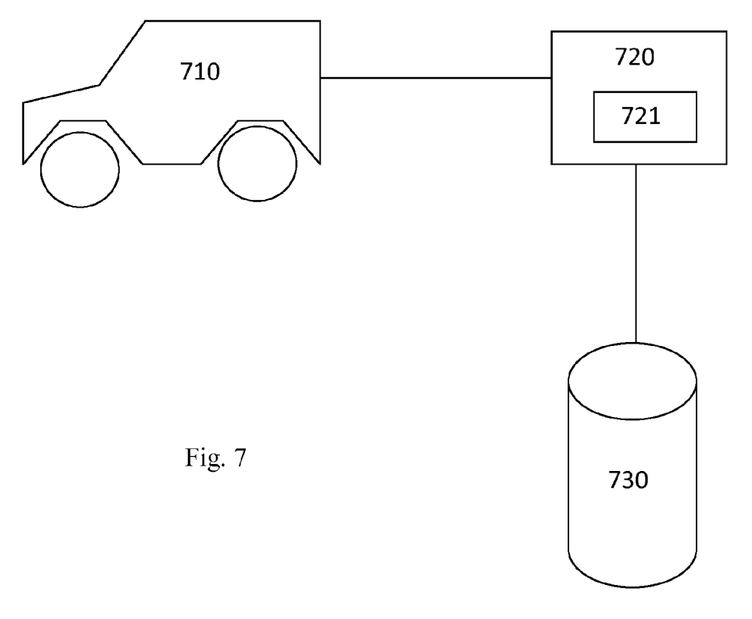
FIG. 7 illustrates an apparatus according to an embodiment of the invention.

FIG. 7 illustrates a mapping system comprising a survey vehicle 710 which is, at least periodically, communicatively coupled to a data processing unit 720 arranged to store data in a map database 730. As noted above, the survey vehicle 710 comprises one or more cameras which output image data of roads which the survey vehicle 710 traverses or drives along. The image data is stored in a data storage device in the survey vehicle 710, such as one or more optical, magnetic or solid state based storage devices. The survey vehicle 710 is further arranged to store location information corresponding to the image data, wherein the location information indicates a geographic location at which corresponding image data is obtained. The location information may be obtained from a GPS receiver. Furthermore, it will be realised that the survey vehicle 710 may comprise other measurement or data recording equipment, such as one or more measurement lasers etc.

The stored image and location data may be transferred to one or more storage devices accessible by the data processing device 720. The data processing device 720 may be a map data server arranged to analyse data obtained from survey vehicles 710 to update the map database 730. The data processing unit 720 is arranged to perform a method according to an embodiment of the invention to determine locations at which lane divider markings change type. The method may be performed by a lane marking analysis module 721 operatively supported by the data processing device 720. The data processing unit 720 is arranged to store in the mapping database 730 marking type change information indicating one or more geographic locations at which the lane divider marking changes type, for example from a continuous line to a dashed line. The marking type change information may be stored alongside or associated with corresponding image data. By identifying geographic locations at which lane divider markings change type, an operator may view image data corresponding to those locations without a need to inspect image data along entire sections of road. That is, the operator may simply go straight to locations at which the lane divider markings change type. The operator may then verify that the map database 730 correctly stores information indicating the type of lane divider marking at either side of the location. Thus, the mapping database 730 may be more accurately and quickly updated.

Figure 8:
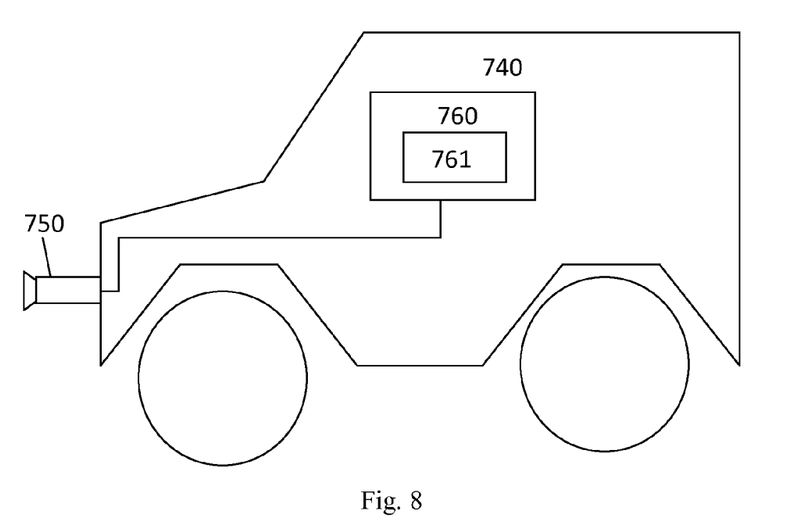
FIG. 8 illustrates a further apparatus according to an embodiment of the invention.

FIG. 8 illustrates another apparatus according to an embodiment of the invention. A vehicle 740 includes at least one camera 750 arranged to view markings on a road surface in front of the vehicle 740. The camera is communicatively coupled to a ADAS system which includes a processor arranged to perform a method according to an embodiment of the invention to detect changes in lane divider marking type. The method may be performed by a lane marking analysis module 761 which executes on the processor of the ADAS system. The lane marking analysis module may be arranged to output a signal indicative of the change in lane divider marking type to one or more other modules executing on the processor of the ADAS system, for example to indicate to a module which signals to a driver of the vehicle 740 when the vehicle 740 strays across a continuous lane divider marking.

It will be realised that road markings, and in particular road markings which divide lanes, vary in style and format on a country to country and/or a state to state basis. The illustrations of lane divider marking in the drawings are merely exemplary.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of determining a location at which a lane divider marking changes type, comprising:
    determining a lane divider marking type separating a first lane from a second lane for a first road segment based upon a frequency spectrum determined by Fourier analysis of first image data corresponding to a first area;
    determining a lane divider marking type separating the first lane from the second lane for a second road segment based upon a frequency spectrum determined by Fourier analysis of second image data corresponding to a second area; and
    determining a geographic location at which the lane divider marking separating the first lane from the second lane changes type according to a comparison of the lane divider marking types for the first and second road segments.

2. The method of claim 1, wherein the Fourier analysis is based upon an intensity signal determined from at least one of the first and second image data.

3. The method of claim 1, wherein the determination of the intensity signal from at least one of the first and second image data comprises determining an intensity of a plurality of regions in the image data.

4. The method of claim 3, wherein each of the plurality of regions are elongate regions having a lengthwise axis generally perpendicular to a lengthwise axis of the image data.

5. The method of claim 4, wherein the lengthwise axis of the image data is generally parallel to an axis of the lane divider marking.

6. The method of claim 1, comprising receiving road image data corresponding to at least a portion of a road and determining portions of the road image data corresponding to the first and second image data.

7. The method of claim 1, wherein the first and second areas partially overlap.

8. The method of claim 1, wherein the types of lane divider markings for at least one of the first and second road segments are determined with respect to a reference frequency spectrums corresponding to a plurality of different types of lane divider markings.

9. The method of claim 1, comprising storing in a map database (730) an indication of one or more of the geographical locations at which the lane divider marking changes type.

10. An apparatus, comprising:
a processor;
wherein the processor has a lane divider analysis module executing thereon, wherein the lane divider analysis module is arranged to determine a lane divider marking type separating a first lane from a second lane for a first road segment based upon a frequency spectrum of image data corresponding to a first area of a road, to determine a lane divider marking type separating the first lane from the second lane for a second road segment based upon a frequency spectrum of image data corresponding to a second area of the road, and to determine a location at which a lane divider marking separating the first lane from the second lane changes type according to a comparison of lane divider marking types for the first and second road segments.

11. The apparatus of claim 10, wherein the apparatus is communicably coupled to a map database and the lane divider analysis module is arranged to store in the map database information indicating one or more geographic locations at which the lane divider marking changes type.

12. The apparatus of claim 11, wherein the information indicating the one or more geographic locations at which the lane divider marking changes type is associated with image data corresponding to each geographic location.

13. The apparatus of claim 10, comprising a storage device for storing image data obtained from one or more cameras of a survey vehicle.

14. The apparatus of claim 10, wherein the apparatus is arranged to receive the image data from one or more cameras mounted on a vehicle.

15. The apparatus of claim 14, wherein the lane divider analysis module is arranged to output a signal to one or more other modules executing on the processor indicative of the change in lane divider marking type.

16. The method of claim 1 further comprising normalizing an intensity of the first image data and an intensity the second image data.

17. The method of claim 16, wherein the normalization occurs during pre-processing.

18. The method of claim 1 further comprising reducing the size of the first image data and the size of the second image data to portions containing the lane divider marking being considered in the first image data and the second image data.

19. The method of claim 18, wherein the reduced portions of the first image data and the second image data are further analysed to determine a lane marker type.

20. A non-transitory computer-readable medium which stores a set of instructions which when executed performs a method of determining a location at which a lane divider marking changes type, the method executed by the set of instructions comprising:
determining a lane divider marking type separating a first lane from a second lane for a first road segment based upon a frequency spectrum determined by Fourier analysis of first image data corresponding to a first area;
determining a lane divider marking type separating the first lane from the second lane for a second road segment based upon a frequency spectrum determined by Fourier analysis of second image data corresponding to a second area; and
determining a geographic location at which the lane divider marking separating the first lane from the second lane changes type according to a comparison of the lane divider marking types for the first and second road segments.

\* \* \* \* \*